United States Patent [19]
Behrens

[11] Patent Number: 4,838,299
[45] Date of Patent: Jun. 13, 1989

[54] PULSATION DAMPENER APPARATUS

[76] Inventor: Robert N. Behrens, 4802 W. Laurel La., Glendale, Ariz. 85304

[21] Appl. No.: 197,640

[22] Filed: May 23, 1988

[51] Int. Cl.[4] .............................................. F16L 55/04
[52] U.S. Cl. .................................... 137/203; 138/26; 138/37
[58] Field of Search .................. 137/207, 203; 138/26, 138/37

[56] References Cited

U.S. PATENT DOCUMENTS 2,707,033  4/1955  Moerke .................................. 138/26
2,795,374  6/1957  Isakoff ............................ 138/26 X Primary Examiner—Alan Cohan
Attorney, Agent, or Firm—H. Gordon Shields

[57] ABSTRACT

Pulsation dampener apparatus includes a cylindrical housing having three baffles dividing the interior of the housing into four chambers. A conduit within the apparatus connects the top and bottom chambers, and a second conduit connects the second, third, and fourth chambers. Pressurized air for operating a pneumatic tool, such as a drill or the like, is connected to the top chamber from a main air line or manifold. The pressurized air flows from the bottom chamber directly to the tool. Back pressure pulsations caused by the tool, are dampened within the second and third chambers of the cylinder so that the pulsations are not fed back into the main air line or manifold, where they may cause problems with other pneumatic tools connected to the main air line or manifold.

11 Claims, 1 Drawing Sheet

PULSATION DAMPENER APPARATUS

BACKGROUND OF THE INVENTION

1. Field of the Invention

This invention relates to pneumatic tools, and more particularly, to dampening apparatus for substantially completely dampening pulsations in pressurized air lines from a pneumatically operated tool.

2. Description of the Prior Art

Pneumatic tools, such as drills and the like, which reciprocate due to air pressure being delivered to opposite sides of a piston, cause back pressure pulses in the pressurized air supply line. The pulses result from the switching of a valve which feeds the pressurized air to the opposite sides of the piston.

Since air is supplied at substantially constant pressure, the switching of the valve in the tool, which in turn routes the air to opposite sides of the piston within the tool, causes pulsations to be back fed into the air supply. The air pressure pulsations may cause malfunctioning of air supply valves of other tools controlling the air pressure from the supply line or manifold to which the pneumatic tools are connected. Where there are several tools operating from a single manifold, the air pulsations can have a severely adverse effect on the controlling valves of the tools and of the air manifold itself.

In some instances, a relatively simple accumulator may sometimes be used to help control the pulsations. However, such accumulators are generally not effective if there is more than one tool connected to the manifold. Moreover, the accumulators have only a relative limited effect on smoothing out the pressure pulsations.

The apparatus of the present invention overcomes the deficiencies of the prior art and provides a substantial dampening on pulsations caused by a pneumatic reciprocating tool.

SUMMARY OF THE INVENTION

The invention described and claimed herein comprises a sealed housing having a plurality of separate compartments, with a conduit connecting top and bottom compartments for flow-through air pressure, with the air pressure supplied to the top compart- ment flowing to the bottom compartment. The air pressure is taken from the bottom compartment and passed to a reciprocating pneumatic tool. The other two interior chambers within the housing are connected to the bottom chamber by a separate conduit. Orifices in the connecting conduit limit the air flow to the chamber. The location of the separate conduit relative to the air flow in the bottom chamber provides appropriate air pressure control in the two interior chambers.

Among the objects of the present invention are the following:

To provide new and useful pulsation dampening apparatus;

To provide new and useful apparatus for dampening back pressure pulses from a pneumatically actuated tool;

To provide new and useful apparatus for dampening pulses from a pneumatic reciprocating tool in a pressure supply line;

To provide new and useful pulsation dampening apparatus having a housing and a plurality of compartments; and To provide new and useful pulsation dampening apparatus for a compressed air supply line having a housing divided into a plurality of compartments, with the compartments being connected in a particular manner.

DESCRIPTION OF THE PREFERRED EMBODIMENT

Figure 1:
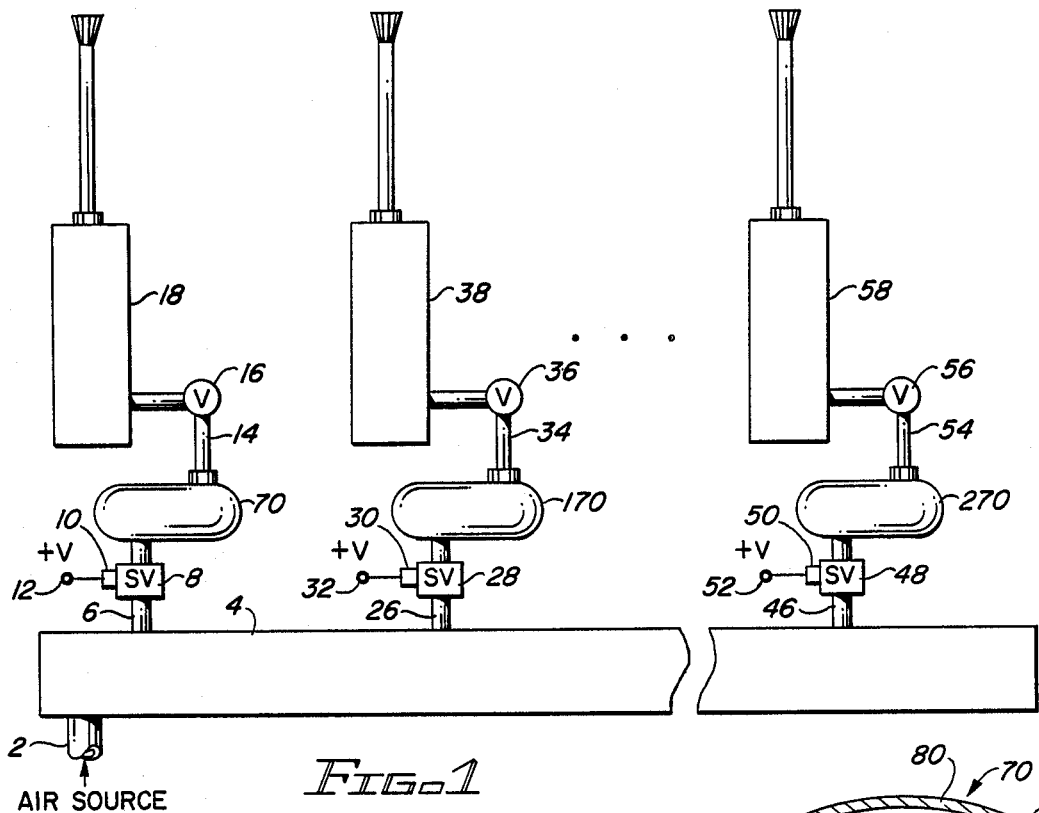
FIG. 1 is a schematic view of the use environment of the apparatus of the present invention.
Figure 2:
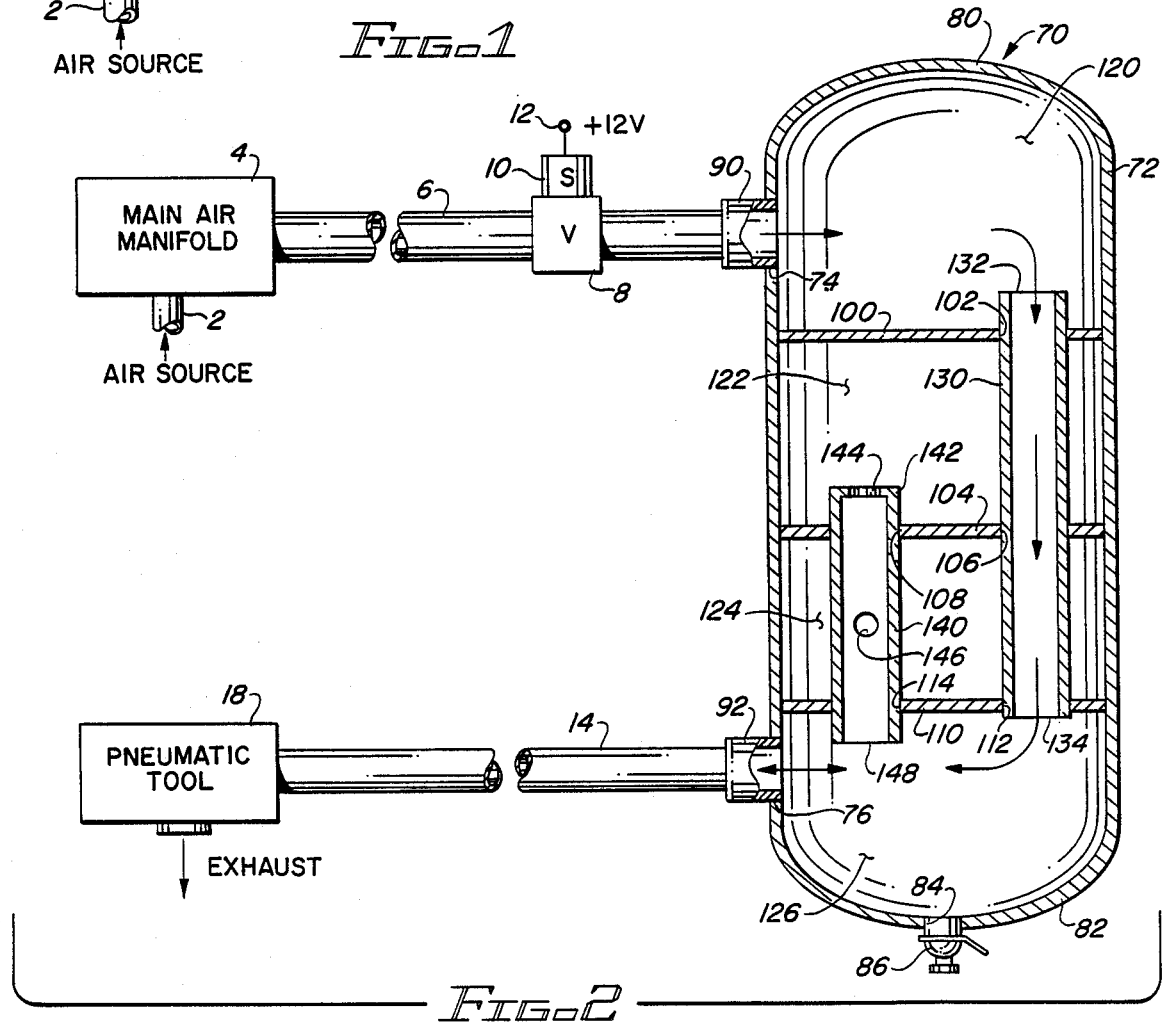
FIG. 2 is a view in partial section of the apparatus of the present invention with a schematic representation of the associated elements of its use environment.

FIG. 1 is a schematic representation of a compressed air source conduit or main air line 2 connected to a compressed air manifold 4. Three pneumatic drills 18, 38, and 58 are in turn connected to the manifold 4. FIG. 2 is a view in partial section of a pulsation dampener apparatus 70, secured to the pneumatic drill or tool 18. The various elements associated with the pulsation dampener apparatus 70 are shown in FIG. 2, and they are also shown in FIG. 1. For convenience, the pulsation dampening apparatus 70, 170, and 270 are shown in FIG. 1 slightly different, structurally, from the way they are shown in FIG. 2.

In FIG. 1, each drill 18, 38, and 58 includes its own pulsation dampener apparatus. Each pulsation dampener apparatus is disposed between the main air manifold 4 and the respective pneumatic drills or tools 18, 38, and 58. For the following discussion reference will be made to both FIGS. 1 and 2.

As indicated previously, with a plurality of pneumatic tools 18, 38, 58 all connected to the manifold 4, and without the dampening apparatus 70, 170, and 270, pulsations from the tools would be transmitted backwardly through the air conduits to the manifold 4, and through the manifold 4 to the other tools which are connected to the manifold 4. The pulsations in turn could cause problems with the various tools.

To isolate the tools from the manifold 4, and to effectively dampen the pulsations caused by the respective tools, the apparatus of the present invention, such as the pulsation dampener apparatus 70, 170, and 270, is inserted between the manifold 4 and the tools.

The tool 18 is connected to the manifold 4 through a conduit 6, the pulsation dampener apparatus 70, and a conduit 14. A valve 8 controls air flow from the manifold 4 through the conduit 6. The valve 8 in turn is controlled by a solenoid 10. A current source 12 in turn controls the solenoid 10.

A valve 16 controls air flow through the conduit 14. For the tool 38, a conduit 26 extends from the manifold 4 to pulsation dampener apparatus 170. A conduit 34 extends from the pulsation dampener apparatus 170 to the tool 38. A valve 28 is disposed in the conduit 26. The valve 28 is controlled by a solenoid 30. A current source 32 controls the solenoid 30. A valve 36 is disposed in the conduit 34.

The tool 58 is connected to the manifold 4 through a conduit 46, pulsation dampener apparatus 270, and a conduit 54. A valve 48 is disposed in the conduit 46, and is controlled by a solenoid 50. The solenoid 50 is in turn controlled from a current source 52. A valve 56 is disposed in the conduit 54.

The pulsation dampener apparatus 70, 170, and 270 are substantially identical. Accordingly, only the pulsation dampening apparatus 70 will be discussed in detail.

As indicated above, the pulsation dampener apparatus 70 is shown in partial section in FIG. 2.

The pulsation dampener apparatus 70 includes a cylindrical shell 72. The cylindrical shell 72 is closed at one end by a head 80 and at the other end by a head 82. For convenience, and in accordance with the illustration in FIG. 2, the head 80, which is generally convex in configuration, may be considered as the top or head end. The head 82 may be considered as the bottom head or end. The terms "head" and "end" are relative and arbitrary, as are the designations "top" and "bottom".

An aperture 74 extends through the cylindrical shell 72 adjacent to the top head or end 80. An aperture 76 extends through the cylindrical shell 72 adjacent to the bottom head or end 82. A coupling 90 is secured in the aperture 74. The conduit 6 is secured to the coupling 90. A coupling 92 is secured in the aperture 76. The conduit 14 is secured to the coupling 92.

Three transversely extending plates or baffles divide the apparatus 70 into four separate chambers. There is a top plate or baffle 100, a middle baffle or plate 104, and a bottom baffle or plate 110. The top baffle or plate 100 includes an aperture 102 extending through it. The middle plate or baffle 104 includes two apertures extending through it. The two apertures include an aperture 106 and 108. The aperture 106 is aligned with the aperture 102 in the top plate 100.

The bottom plate or baffle 110 also includes two apertures, an aperture 112 and an aperture 114. The aperture 112 is aligned with the apertures 102 and 106. The aperture 114 is aligned with the aperture 108.

With the three baffles or plates appropriately secured to the cylinder or cylindrical shell 72, and appropriately spaced apart longitudinally or axially from each other, four separate chambers are defined within the cylindrical shell 72 and its heads 80 and 82. There is a top expansion chamber 120 is disposed within the cylinder 72 and between the top head 80 and the plate 100. An upper differential air pressure chamber 122 is defined with the cylinder 72 and between the plates 100 and 104. A pulse chamber 124 is between the plates 104 and 110, and a bottom expansion chamber 126 is disposed between the plate 110 and the bottom head 81, all within the cylinder 72. The chambers 122 and 124 are low pressure chambers, disposed between the two expansion chambers.

A pipe 130 is disposed within the apertures 102, 106, and 112. The pipe 130 is appropriately secured to the plates 100, 104, and 110 in the respective apertures. The pipe 130 conducts pressurized air from the chamber 120 to the chamber 126. The pipe 130 includes a top opening 132 and a bottom opening 134. The openings 132 and 134 are the respective top and bottom ends of the pipe, and they are disposed respectively in the chamber 120 and in the chamber 126.

An orifice pipe 140 is disposed within, and appropriately secured to, the aligned apertures 108 and 114 in the plates 104 and 110, respectively. The orifice pipe 140 includes a top end plate 142 within the differential air pressure chamber 122. An orifice 144 extends through the top plate 142. Extending through the wall of the pipe 130 within the chamber 124 is an orifice 146.

The orifice pipe 140 includes a bottom end 148 which is disposed within the chamber 126. The bottom end 148 is unrestricted, and is appropriately aligned with the coupling 92. It will be noted, as shown in FIG. 2, that the bottom 134 of the pipe 130 is above the bottom 148 of the pipe 140. Thus, the bottom 148 of the pipe 140 extends below the plate 110 a greater distance than does the bottom 134 of the pipe 130.

In operation, pressurized air flows from the main air conduit 2, from an appropriate air source, such as a compressor, not shown, into the main air manifold 4. From the main manifold 4, pressurized air flows through the conduit 6, when the valve 8 is opened, and through the coupling 90 into the top expansion chamber 120. Pressurized air then flows through the pipe 130 and into the bottom expansion chamber 126. The flow of pressurized air in the chamber 126 from the bottom 134 of the pipe 130 passes the bottom 148 of the orifice pipe 140 and flows into the coupling 92 and to the conduit 14 and thence to the tool 18.

Due to the flow of the air past the bottom 148 of the pipe 140, there is a low pressure or low pressure or vacuum pulled through the pipe 140. The low pressure or vacuum in turn is impressed on the chambers 122 and 124 through the orifices 144 and 146 of the pipe 140, respectively. With the differential air pressure in chambers 122 and 124, with respect to the pressure in chambers 120 and 126, pulsations caused by the opening and closing of the valve in the tool 18 and flowing backwards through the conduit 14 and into the expansion chamber 126 are then absorbed or dampened by the chambers 122 and 124. Rather than being transmitted backwardly from the chamber 126, and through the pipe 130 and into the chamber 120 and through the conduit 6 into the manifold 4, the pulsations are dampened within the apparatus 70. The relatively low air pressure existing in chambers 122 and 124 absorbs or dampens the pulsations which would otherwise comprise excess pressure pulses feeding backwards through the compressed air system.

The use of the two low pressure chambers 122 and 124 causes the pulses to slow down by providing a longer path than there would be if only a single low pressure chamber were used.

Essentially, the pulsation dampening apparatus 70 absorbs or dampens the pulsations in the air pressure line 14 caused by the opening and closing of the valve in the tool 18. The other tools connected to the manifold 4, such as the tools 38...58, as shown in FIG. 1, are accordingly not affected by the dampened pulsations. Similarly, the pulsation dampening apparatus 70 and the pulsation dampening apparatus 270 absorb or dampen the pulsations from the pneumatic tools 38 and 58, respectively. Thus, the pulsations of each air driven (pneumatic) tool are absorbed or dampened by their own respective dampening apparatus. Each tool is accordingly unaffected by the pulsations of the other tools connected to the common manifold and supplied by a common source of pressurized air.

The drain valve 86, at the lowest point in the bottom head 82, allows for the draining of any condensed moisture from the chamber 126. The placing or placement of the drain valve 86 assumes that the pulsation dampening apparatus 70 will be oriented substantially vertically, as illustrated in FIG. 2. However, this orientation is not necessarily so. It is accordingly understood that the drain valve 86, or any other drain valves required for the drainage of condensed moisture from the other chambers, will be appropriately located, depending on the anticipated orientation of the pulsation dampening apparatus 70 in a particular system.

Referring again to FIG. 1, it will be noted that only three tools are specifically disclosed. However, it is obvious that additional tools may be utilized in the system, and connected to the main manifold 4. This is indicated by the three dots between the tools 38 and 58 and by the broken lines in the manifold 4. Typically, for example, there may be a gang of five pneumatic drills connected to the manifold 4. The drills may be operated together, substantially simultaneously, or separately, as desired. However, if they are used substantially simultaneously, as is the most typical situation, the pulsation dampener apparatus, such as the apparatus 70, 170...270, isolates each pneumatic drill (tool) from the manifold 4 and thus from each other drill (tool). The adverse effects of the pressure pulsations are thus not transmitted to the pneumatic system and they accordingly do not affect the other drills (tools).

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Pulsation dampening apparatus for compressed air, comprising, in combination:

cylinder means for receiving compressed air and out of which the compressed air flows;

plate means, including a first plate and a second plate, for dividing the cylinder means into a plurality of chambers, including a first expansion chamber, a second expansion chamber, and low pressure chamber means for dampening pulsations;

first pipe means for providing communication between the first and second expansion chambers;

second pipe means for providing communication between the second expansion chamber and the low pressure chamber means;

orifice means in the second pipe means in the low pressure chamber means;

first coupling means communicating with the first expansion chamber for providing a flow of pressurized air to the cylinder means and to the first pipe means; and second coupling means communicating with the second expansion chamber, adjacent to the second pipe means and remote from the first pipe means in the second expansion chamber, for providing a flow of pressurized air out of the second expansion chamber and aligned with the second pipe means for impressing a differential pressure on the low pressure chamber means through the second pipe means in response to the flow of pressurized air from the first pipe means past the second pipe means and out of the cylinder means and for receiving pulsations and for transmitting the pulsations to the second expansion chamber and to the low pressure chamber means for dampening the pulsations.

2. The apparatus of claim 1 in which the plate means includes a third plate, and the low pressure chamber means includes a first low pressure chamber between the first plate and the third plate and a second low pressure chamber between the second plate and the third plate.

3. The apparatus of claim 2 in which the first pipe means is secured to the first plate, the second plate, and the third plate.

4. The apparatus of claim 2 in which the orifice means includes a first orifice in the first low pressure chamber and a second orifice in the second low pressure chamber.

5. The apparatus of claim 4 in which the second pipe means includes a pipe secured to the second plate and the third plate, and the pipe extends into the second expansion chamber.

6. The apparatus of claim 1 in which the cylinder means includes a cylinder, a top head closing the cylinder and defining, with the cylinder and the first plate, the first expansion chamber.

7. The apparatus of claim 4 in which the cylinder means further includes a bottom head closing the cylinder remote from the top head and defining, with the cylinder and the second plate, the second expansion chamber.

8. The apparatus of claim 1 in which the second pipe means is disposed between the second coupling means and the first pipe means.

9. The apparatus of claim 8 in which the first pipe means includes an end in the second expansion chamber adjacent to the second plate and remote from the second coupling means.

10. The apparatus of claim 9 in which the second pipe means includes an end disposed within the second expansion chamber, and the end is aligned with the second coupling means, and the flow of air from the end of the first pipe means in the second expansion chamber to the second coupling means is past the end of the second pipe to impress the differential pressure on the pulse and differential pressure chamber means.

11. The apparatus of claim 1 in which the cylinder means includes drain plug means for draining moisture from the cylinder means.

* * * * *